US010620913B2

(12) United States Patent
Beatty et al.

(10) Patent No.: US 10,620,913 B2
(45) Date of Patent: Apr. 14, 2020

(54) PORTABLE VOICE ASSISTANT DEVICE WITH LINEAR LIGHTING ELEMENTS

(71) Applicant: Amazon Technologies, Inc., Seattle, WA (US)

(72) Inventors: Jacob William Beatty, Mountain View, CA (US); Emeka Godswill Ugwu, San Jose, CA (US); Josue Jean Rodriguez, San Jose, CA (US); Eric Gifford Marason, San Francisco, CA (US); Miguel Virgen, San Jose, CA (US); Jordan Pine, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/831,041

(22) Filed: Dec. 4, 2017

(65) Prior Publication Data

US 2019/0171413 A1 Jun. 6, 2019

(51) Int. Cl.

| G06K 7/00 | (2006.01) |
|---|---|
| G06F 3/16 | (2006.01) |
| F21V 7/22 | (2018.01) |
| F21S 4/28 | (2016.01) |
| F21V 3/02 | (2006.01) |
| F21V 21/096 | (2006.01) |
| F21V 21/08 | (2006.01) |
| B60Q 3/59 | (2017.01) |
| H04R 1/02 | (2006.01) |
| H04R 1/04 | (2006.01) |
| F21V 19/00 | (2006.01) |
| F21V 8/00 | (2006.01) |
| G10L 15/30 | (2013.01) |
| F21Y 115/10 | (2016.01) |

(Continued)

(52) U.S. Cl.
CPC .............. *G06F 3/167* (2013.01); *B60Q 3/59* (2017.02); *F21S 4/28* (2016.01); *F21V 3/02* (2013.01); *F21V 7/22* (2013.01); *F21V 19/0015* (2013.01); *F21V 21/0808* (2013.01); *F21V 21/096* (2013.01); *G02B 6/002* (2013.01); *H04R 1/028* (2013.01); *H04R 1/04* (2013.01); *F21Y 2103/10* (2016.08); *F21Y 2115/10* (2016.08); *G10L 15/22* (2013.01); *G10L 15/30* (2013.01); *G10L 25/78* (2013.01); *G10L 2015/223* (2013.01)

(58) Field of Classification Search
CPC .......... B60Q 1/2696; B60Q 1/32; B60Q 3/35
USPC ........................ 362/486, 487, 488
See application file for complete search history.

(56) References Cited

U.S. PATENT DOCUMENTS

| 6,980,092 B2* | 12/2005 | Turnbull | ................ B60R 1/12 |
| | | | 307/10.1 |
| 7,321,354 B1* | 1/2008 | Jacobsen | ................ H04N 7/142 |
| | | | 345/102 |
| 2002/0159270 A1* | 10/2002 | Lynam | ................ B60K 35/00 |
| | | | 362/492 |

* cited by examiner

*Primary Examiner* — Daniel St Cyr
(74) *Attorney, Agent, or Firm* — Eversheds Sutherland (US) LLP

(57) ABSTRACT

Systems, methods, and computer-readable media are disclosed for portable voice assistant devices with linear lighting elements. In one embodiment, an example device may include a housing having a first portion and a second portion, an elongated light bar disposed between the first portion and the second portion, and a first LED disposed within the housing. Example devices may include a reflector component configured to reflect light towards the elongated light bar, and a diffuser positioned adjacent to the elongated light (Continued)

bar. The diffuser may include a first curved portion and a flat portion, and the first curved portion may be substantially aligned with the first LED.

20 Claims, 8 Drawing Sheets

(51) Int. Cl.
*F21Y 103/10* (2016.01)
*G10L 15/22* (2006.01)
*G10L 25/78* (2013.01)

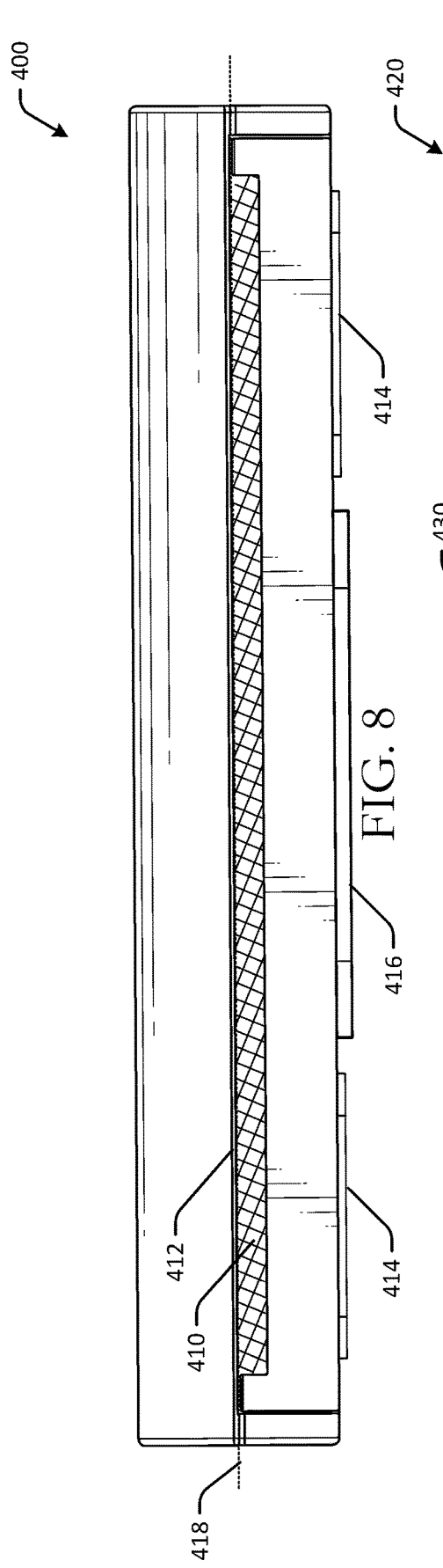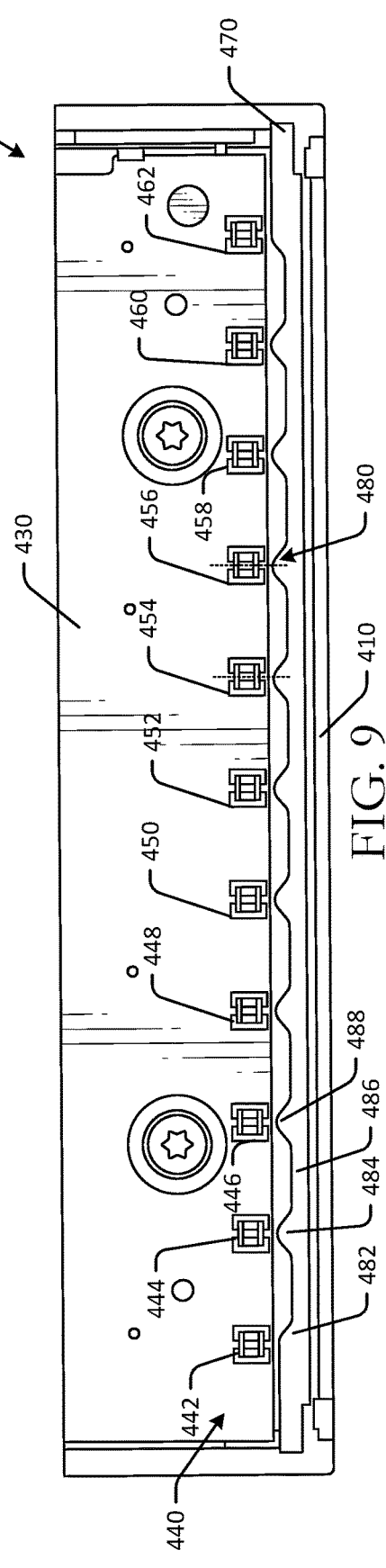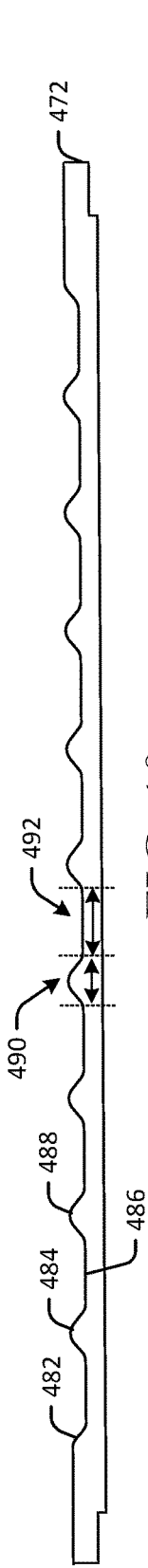

PORTABLE VOICE ASSISTANT DEVICE WITH LINEAR LIGHTING ELEMENTS

BACKGROUND

Portable devices may be used in loud or noisy environments. Some portable devices may be voice-based devices and may detect voice commands. However, in loud or noisy environments, such as automobiles, devices may be subject to dynamic conditions, including noise, daylight or direct sunlight, and/or constantly changing ambient environments, as opposed to more predictable ambient environments, such as a home environment. For such devices, providing visual or audio feedback to a user may be difficult. Accordingly, portable devices that can provide visual and/or audio feedback in various environments may be desired.

BRIEF DESCRIPTION OF THE DRAWINGS

FIG. 8 is a schematic drawing of a portable voice assistant device with a linear lighting element in front view in accordance with one or more embodiments of the disclosure.

FIG. 9 is a schematic drawing of a portion of a portable voice assistant device in cross-sectional view in accordance with one or more embodiments of the disclosure FIGS. 10-11 are schematic drawings of diffuser components in top and perspective views in accordance with one or more embodiments of the disclosure.

Figure 1:
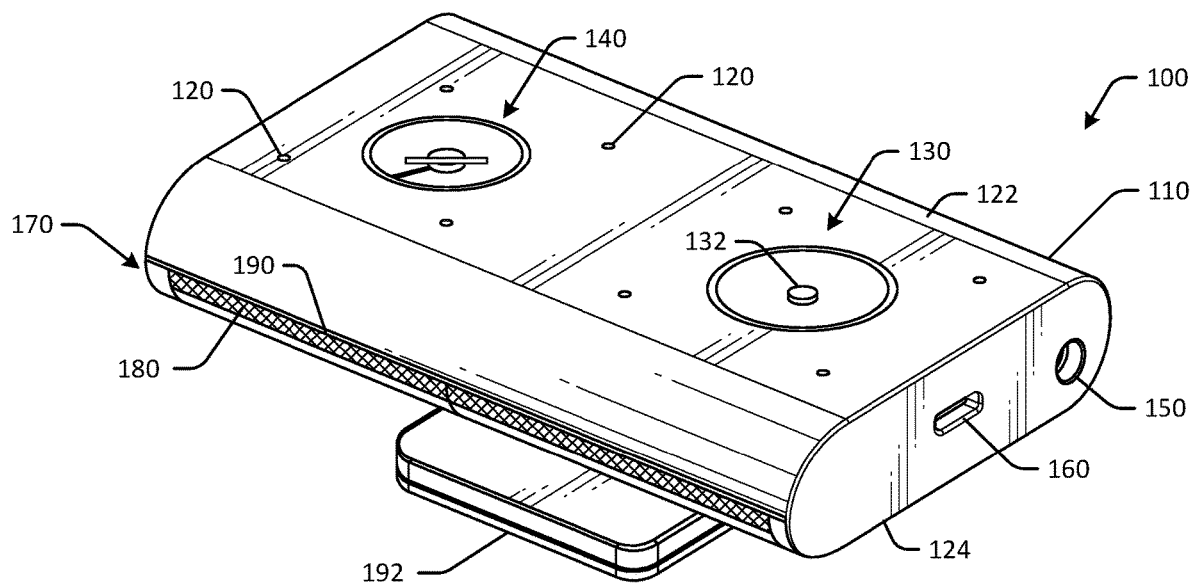
FIGS. 1-2 are schematic drawings of a portable voice assistant device with a linear lighting element in perspective view in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may encompass, depending on the context, a plural number of such components or elements and vice versa.

DETAILED DESCRIPTION

Overview

Operation of some voice assistant devices may be voice-based. For example, certain voice assistant devices may be controlled by voice-based commands or may otherwise respond to verbal or audible utterances. In another example, voice assistant devices may detect sounds in an ambient environment and may determine that a voice assistant is being invoked based on, for example, detection of a wakeword or other trigger. A user may say or utter the wakeword to invoke the voice assistant. The voice assistant device may detect the wakeword and listen for a request or voice command, and may respond accordingly. For example, the voice assistant device may cause one or more operations to be performed, such as controlling other devices (e.g., televisions, lights, radios, thermostats, etc.), may respond with audio or visual information (e.g., weather, news, messages, etc.), and/or may perform different actions in response to a request or command. During interaction with a user, certain voice assistant devices may provide a visual indicator that is indicative of interaction with one or more users. For example, voice assistant devices may include one or more light emitting diodes (LEDs), lighting elements, light bars, displays, and/or other visual indicators that may indicate to a user that the voice assistant device is active, listening, not listening, processing, speaking, and/or other actions.

In some environments, such as in automobiles or other outdoor environments, interaction with voice assistant devices may be difficult due to unpredictable conditions, such as noise, sunlight, weather conditions, vibration, motion, and so forth. In such environments, audible communication from one or more speakers of a voice assistance device may be difficult to hear by one or more users. Similarly, in such environments, visual indicators, if any, associated with the voice assistant device may be difficult to see or detect by users.

Embodiments of the disclosure may include mobile and/or portable voice assistant devices that are configured to operate in various ambient environments, such as outdoor conditions, high temperatures, etc., while maintaining audible and/or visual interaction capabilities with users. For example, embodiments of the disclosure may include linear lighting elements, such as light bars or other configurations of lighting elements, that maintain visibility and/or are visible by users in any number of lighting conditions, including direct sunlight. As a result, embodiments of the disclosure may maintain visual indication functionality in various ambient environments. In addition, certain embodiments may include audio settings with certain frequencies, so as to be audible over noises such as road noise, thereby maintaining audio-based or voice-based functionality in a number of ambient environments. Certain embodiments may include features such as tactile buttons that include raised protrusions, so that users can identify or locate buttons without looking at the voice assistant device. Portable voice assistant devices may be removably mounted to surfaces, such as magnetically mounted, to maintain portability and facilitate quick positioning and removal of devices in various environments.

The techniques, methods, and processes described herein may be used to detect and/or determine voice-based requests or commands, and to initiate actions that may include controlling other electronic devices and/or automobile components. For example, certain embodiments may be configured to output signals that control aspects of vehicles, such as HVAC systems, radio settings, windows, and so forth, and may be configured to output audio signals via one or more speakers or an audio connection to a vehicle's speakers.

This disclosure relates to, among other things, systems, methods, computer-readable media, techniques, and methodologies for portable voice assistant devices with linear lighting elements. Embodiments may include devices that can be voice-controlled and respond to audible instructions, output audio content, control other electronic devices and/or other operations. Some embodiments include a light bar or other visual indicator that can be used to convey certain information to a user, such as a detected location or direction of sound or a sound source, or a detected location of the user that is currently being listened to by the device, as well as device states, such as a listening state, a processing state, a muted or privacy state, and/or other states. As a result, embodiments of the disclosure may be configured to provide audio and/or visual indicators to users in various environments. Certain embodiments may include light bar features or other components that can be used to convey information to users.

Figure 2:
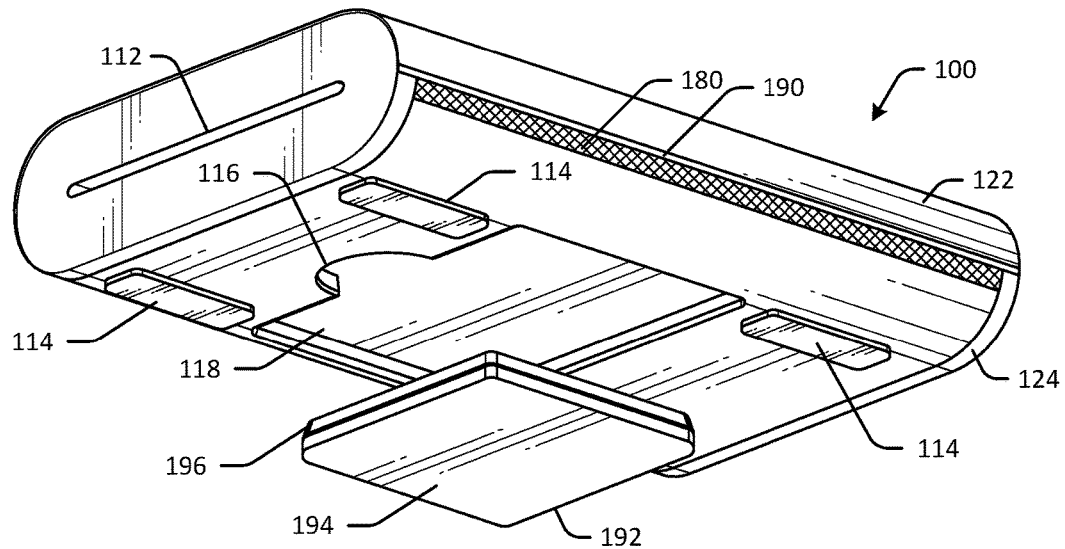

Referring to FIGS. 1-5, an example portable voice assistant device 100 is depicted in accordance with one or more embodiments of the disclosure. FIG. 1 depicts the portable voice assistant device 100 in a top perspective view and FIG. 2 depicts the portable voice assistant device 100 in a bottom perspective view. The portable voice assistant device 100 may include one or more linear lighting elements or light bars. The portable voice assistant device 100 may be configured for use in mobile or outdoor environments, such as in automobiles or other vehicles. The portable voice assistant device 100 may have a housing 110. The housing 110 may be formed of one or more portions. For example, the housing 110 may include a first portion 122 and a second portion 124. The first portion 122 may be a top portion and the second portion 124 may be a bottom portion ("top," "bottom," and "side" are used to describe relative and not absolute positioning).

Figure 3:
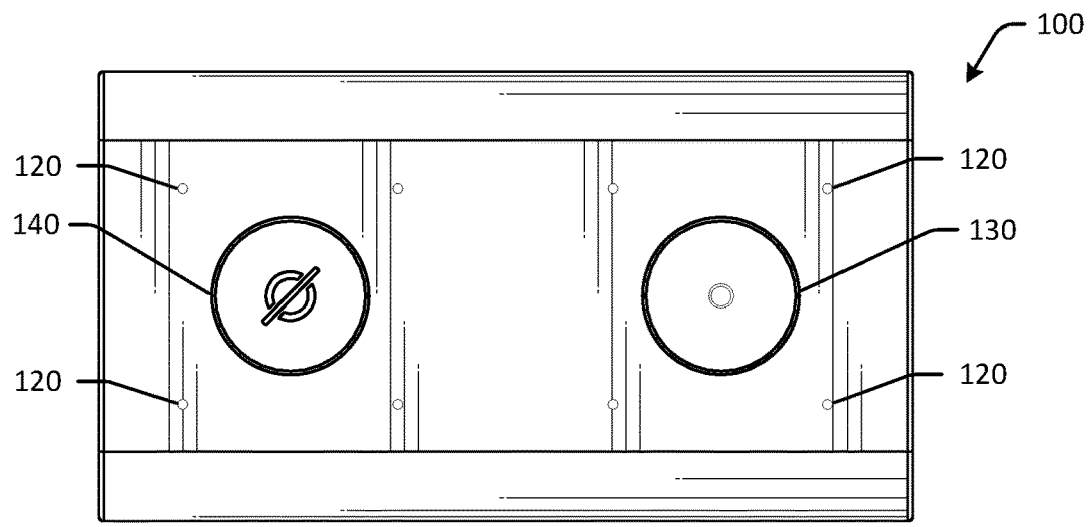
FIG. 3 is a schematic drawing of the portable voice assistant device of FIG. 1 in a top view in accordance with one or more embodiments of the disclosure.

The portable voice assistant device 100 may include one or more microphones configured to detect sound and/or generate an audio signal. The microphones may be positioned within the housing 110 and may correspond to the locations of one or more microphone holes 120 on the first portion 122 of the housing 110. In some embodiments, the portable voice assistant device 100 may include a microphone array with a plurality of microphones. The microphone array may include individual microphones arranged or oriented so as to detect sounds from either a "left" side or a right "side" of the portable voice assistant device 100. In one example, the left side of the portable voice assistant device 100 may correspond to a location of a driver of a vehicle, and the right side may correspond to the location of a front seated passenger in the vehicle, or vice versa. In the example of FIGS. 1-5, the portable voice assistant device 100 may include eight microphones positioned in a two-by-four array arrangement. FIG. 3 depicts the portable voice assistant device 100 in a top view and illustrates the arrangement of the eight microphone holes 120 in the illustrated embodiment. The portable voice assistant device 100 may include one or more optional speakers, and may include a speaker slot 112 for sound to travel through the housing 110 from any internal speakers.

The portable voice assistant device 100 may include one or more pressable or physical buttons. For example, the portable voice assistant device 100 may include an action button 130 with a raised protrusion 132 or raised nub that can be used to locate the action button 130 by a user without visualizing the action button 130. The portable voice assistant device 100 may include a privacy button 140 or a mute button that also includes a raised protrusion or other tactile feature that can be used to locate the privacy button 140.

Figure 5:
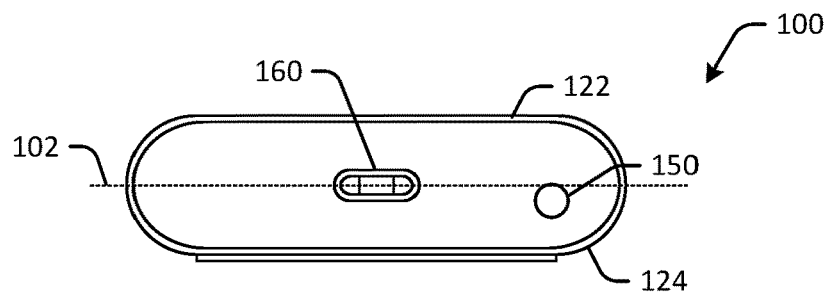
FIG. 5 is a schematic drawing of the portable voice assistant device of FIG. 1 in a side view in accordance with one or more embodiments of the disclosure.

The portable voice assistant device 100 may include one or more connection ports that can be used to create one or more wired or wireless connections. For example, the portable voice assistant device 100 may include a first connection port 150 that may be an auxiliary connection port and can be used for input or output of data, such as audio. The portable voice assistant device 100 may include a second connection port 160 that may be an input and/or output port, such as a USB 3.0, microUSB, and/or other connection or charging port. Either or both the first connection port 150 and/or the second connection port 160 may be offset from a horizontal axis 102 of the portable voice assistant device 100. The horizontal axis 102 may be an axis passing through a center of the housing 110, as illustrated in FIG. 5. The second connection port 160 in the illustrated embodiment may be wholly, or at least partially, positioned on one side of the horizontal axis 102, such as a side of the horizontal axis 102 that includes the second portion 124, or the bottom portion, of the housing 110. The connection port(s) of the portable voice assistant device 100 may be positioned on one or more sides of the portable voice assistant device 100 (e.g., on the right side of the portable voice assistant device 100 as illustrated, etc.).

The portable voice assistant device 100 may include a linear lighting element 170. The linear lighting element 170 may be a lighting component, such as a light bar, that can be used to provide one or more visual indicators. The linear lighting element 170 may be positioned on a front side of the portable voice assistant device 100 (e.g., front relative to the top, bottom, left, and right sides in this example). The linear lighting element 170 may output light that is visible by users. As described herein, the linear lighting element 170 may include one or more top-firing or side-firing LEDs aimed at a right angle or perpendicular to a light bar output or light bar component. The linear lighting element 170 may include a scattering reflector angled at approximately 45 degrees to the LEDs, and a translucent diffuser bar with peaked ridges that are aligned with individual LED centers. Certain embodiments of the linear lighting element 170 may include a partially transparent neutral density filter that serves as the light bar or light output aperture, and reduces the sunlight that propagates through the device to the diffuser bar. The peaks of the diffuser bar ridges may scatter and refract light away from LED hot spots or bright spots, resulting in a uniform or near-uniform display as visually discernible. The light bar or lighting element can therefore be used for LED animation by showing a dark spot where an LED is shut off.

The linear lighting element 170 may include a light bar component 180, which may be the light bar or light output aperture. The light bar component 180 may form part of an outer surface of the portable voice assistant device 100. In some embodiments, the light bar component 180 may form part of the housing 110 of the portable voice assistant device

100. The light bar component 180 may be an optically clear or translucent resin of a dark color, such as a black color. The dark color may block or partially block ambient light, such as sunlight, from entering the portable voice assistant device 100 through the light bar component 180. The linear lighting element or light bar component 180 may be an elongated light bar or a translucent black resin component. The linear lighting element and the bottom curved portion together form a second half of the outer surface of the device.

The light bar component 180 may be positioned adjacent to the first portion 122 of the housing 110. In some embodiments, the light bar component 180 may be positioned between the first portion 122 and the second portion 124 of the housing 110. The light bar component 180 may be positioned in a recessed position relative to either or both the first portion 122 and/or the second portion 124. In the illustrated embodiment, the light bar component 180 may be position on the same side of the horizontal axis 102 as the second portion 124, or the bottom portion. As a result, the top portion 122 may form about half or half of the housing or the portable voice assistant device 100, and the second portion 124 and the light bar component 180 together may form a second half or about a second half of the housing or the portable voice assistant device 100. The light bar component 180 may be on a relatively lower half of a front face of the portable voice assistant device 100, as illustrated in FIG. 8. In the example of FIGS. 1-5, the light bar component 180 may be positioned below or adjacent to an end 190 of a curved portion or curved end of the first portion 122 of the housing 110.

Figure 4:
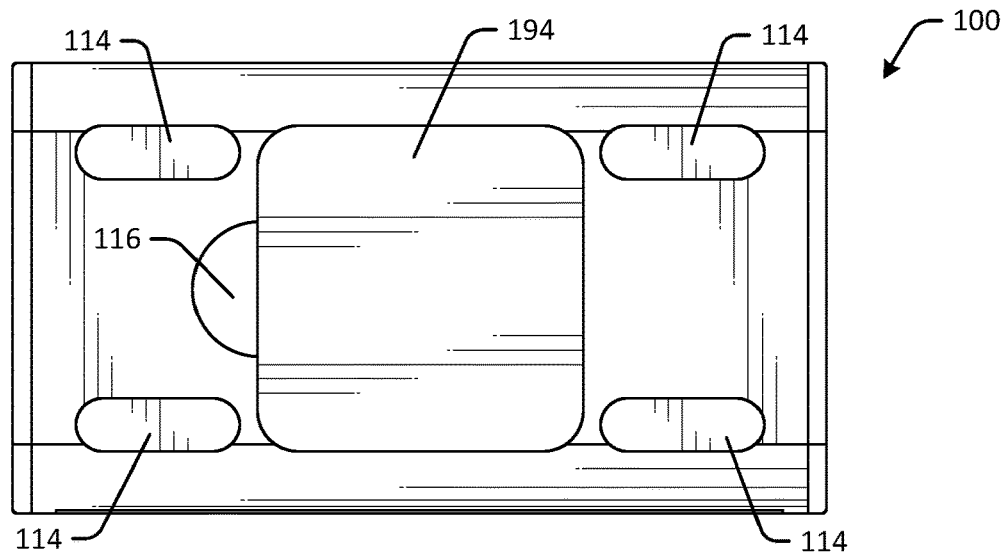
FIG. 4 is a schematic drawing of the portable voice assistant device of FIG. 1 in a bottom view in accordance with one or more embodiments of the disclosure.

The portable voice assistant device 100 may include a number of supports 114, such as rubber feet, positioned along the housing 110 that may be configured to absorb vibration. In the illustrated example, the portable voice assistant device 100 may include four substantially rectangular rubber feet coupled to housing 110 with an adhesive on a bottom portion of the portable voice assistant device 100. FIG. 4 illustrates the portable voice assistant device 100 in a bottom view w.

The portable voice assistant device 100 may include a removable mount 192. The removable mount 192 may be used to position or reposition the portable voice assistant device 100 in different locations. For example, the removable mount 192 may be used to couple the portable voice assistant device 100 to a dashboard or a cup holder of a vehicle. The removable mount 192 may be configured to attach, couple, or connect to the portable voice assistant device 100 via magnetic force, Velcro, friction fit, snap fit, or another mechanical or electrical connection type. The removable mount 192 may include an adhesive side 194 that may be used to couple the removable mount 192 to a surface. In some embodiments, the removable mount 192 may have a magnetic force strong enough to prevent dislocation of the portable voice assistant device 100 in the event of an automobile accident or other incident.

The removable mount 192 may engage the portable voice assistant device 100 at a recessed portion 118 of the portable voice assistant device 100. For example, the portable voice assistant device 100 may include the recessed portion 118 on the second portion 124 of the housing 110. The recessed portion 118 may be any suitable geometry and/or depth, such as square. The recessed portion 118 may be dimensioned to receive the removable mount 192. FIG. 4 illustrated the portable voice assistant device 100 in a bottom view with the removable mount 192 positioned in the recessed portion 118. A finger cutout 116 may be formed adjacent to the recessed portion 118 in the housing 110 and may be used to manually remove the removable mount 192 from the recessed portion 192. The removable mount 192 may include a chamfered edge 196 to aid in guiding the portable voice assistant device 100 onto or off the removable mount 192.

Users may verbally interact with the portable voice assistant device 100 to control the portable voice assistant device 100, as well as to control other electronic devices in the ambient environment. The portable voice assistant device 100 may detect the audible sound from a user and may determine a meaning of the sound. For example, the portable voice assistant device 100 may detect a trigger word or a wakeword of "Alexa," or another trigger word, and may subsequently begin monitoring for voice commands using one or more microphones. In some embodiments, detection and/or processing of voice data or voice commands may be done locally at the portable voice assistant device 100, while in other embodiments the portable voice assistant device 100 may communicate with one or more servers to determine a meaning of a voice command. In some embodiments, the trigger word may be detected and determined locally, while voice commands may be processed remotely. After determining or receiving the meaning of the user utterance, the portable voice assistant device 100 may initiate one or more response actions.

The linear lighting component may be shadowed or otherwise protected by the first portion 122 of the housing 110. As a result, embodiments may have lighting elements that are uniform and have brightness levels and/or contrast levels that are aesthetically appealing and visually discernible in a number of ambient environments. Certain embodiments may reduce safety concerns, for example in automobiles, by providing voice-based control of certain operations, and by providing buttons that can be located without visual aid (e.g., simply by feeling for the button, etc.).

As a result, embodiments of the disclosure may be used in ambient environments with unpredictable noise and/or lighting conditions, and may provide visual and audible indications to users that can be heard or seen in various ambient environments.

Example embodiments of the disclosure provide a number of technical features or technical effects. For example, in accordance with example embodiments of the disclosure, certain embodiments of the disclosure may increase a visibility of light visible in lighting elements, control multiple electronic devices and/or vehicle control systems, detect voice commands, determine meanings of voice commands, and/or initiate actions in response to voice commands. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 6:
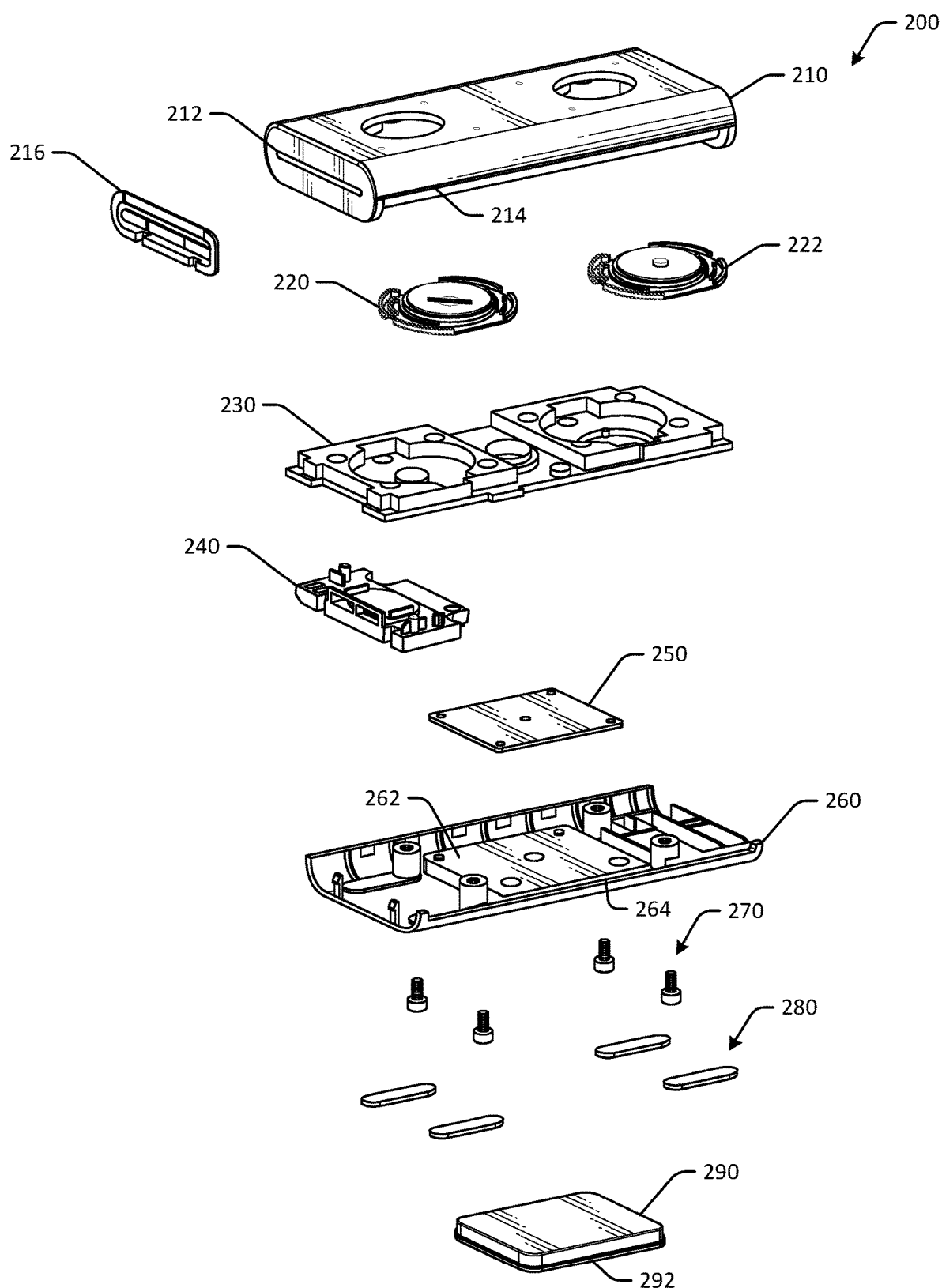
FIG. 6 is a schematic drawing of a portable voice assistant device in an exploded view in accordance with one or more embodiments of the disclosure.

FIG. 6 schematically depicts a portable voice assistant device 200 with one or more linear lighting elements in an exploded view in accordance with one or more embodiments of the disclosure. The portable voice assistant device 200 may be the same or different than the portable voice assistant device of FIG. 1. Other embodiments may include additional or fewer, and/or different, components.

The portable voice assistant device 200 may include a top housing 210. The top housing 210 may form an upper portion of the portable voice assistant device 200. The top housing 210 may include sidewalls of the portable voice assistant device 200. For example, a speaker slot 212 may be formed in a sidewall of the portable voice assistant device 200. The top housing 210 may include a front end portion 214 that forms a cover or shadow, or otherwise shields a light bar component of the portable voice assistant device 200. The front end portion 214 may be positioned at the end of a curved portion of the top housing 210. In some embodiments, the diffuser may be a part of the top housing 210 (e.g., one-shot or two-shot injection mold, etc.), while in other embodiments, the diffuser may be a separate component coupled to the top housing 210 and/or a bottom housing. Optional speaker mesh 216 may be positioned adjacent to the sidewall that includes the speaker slot 212. Other embodiments may have different form factors. For example, top housings may not include curved portions, and/or the portable voice assistant device 200 may have a device top housing that is angled and/or planar so as to provide a recessed portion for a light bar component, so as to block direct sunlight from impinging on the light bar component.

The portable voice assistant device 200 may include one or more physical controls, such as buttons, switches, and other control devices. For example, the portable voice assistant device 200 may include a mute or privacy button 220 that control a microphone of the portable voice assistant device 200. The portable voice assistant device 200 may include an action button 222 that causes the portable voice assistant device 200 to perform one or more actions. The buttons may be made of a rubber or other tactile material and may include raised protrusions for easy location without visibility.

The portable voice assistant device 200 may include a speaker foam 230 that may support one or more electric components, such as microphones, circuitry, connection ports, batteries, speakers, and/or other components. A microphone mesh and/or seal may be disposed about the speaker foam 230. In other embodiments, the component 230 may be any sealing component, such as rubber or foam.

The portable voice assistant device 200 may include a speaker assembly 240. The speaker assembly 240 may include one or more speakers in a certain orientation and may be optionally sealed with foam or another sealant. The speaker assembly 240 may be positioned adjacent to the speaker slot 212. The foam may be configured to prevent or block light from escaping the housing.

A bottom housing 260 may form a bottom portion of the portable voice assistant device 200. The bottom housing 260 may include one or more curved portions. A metal plate 250 may be disposed or coupled to a surface 262 of the bottom housing 260. The metal plate 250 may be used to create a magnetic bond between the portable voice assistant device 200 and a mount. The metal plate 250 may be coupled to an interior surface of the bottom housing 260 with one or more screws 270, for example. In some embodiments, the bottom housing 260 may not include curved portions and may instead include planar surfaces or may be dimensioned so that the top housing 210 creates an overhang that shields the light bar component. Some embodiments may use an opaque paint on a top surface to reduce a likelihood of sunlight impinging directly on the light bar. The bottom housing 260 may include a cutout portion 264 that may be configured to receive a light bar component or light output aperture.

One or more rubber supports 280 may be coupled to the bottom housing 260 and may provide support and stability for the portable voice assistant device 200. A removable magnetic mount 260 may be configured to attract the metal plate 250 and may include an adhesive surface 292 to facilitate positioning of the portable voice assistant device 200 on different surfaces.

Figure 7:
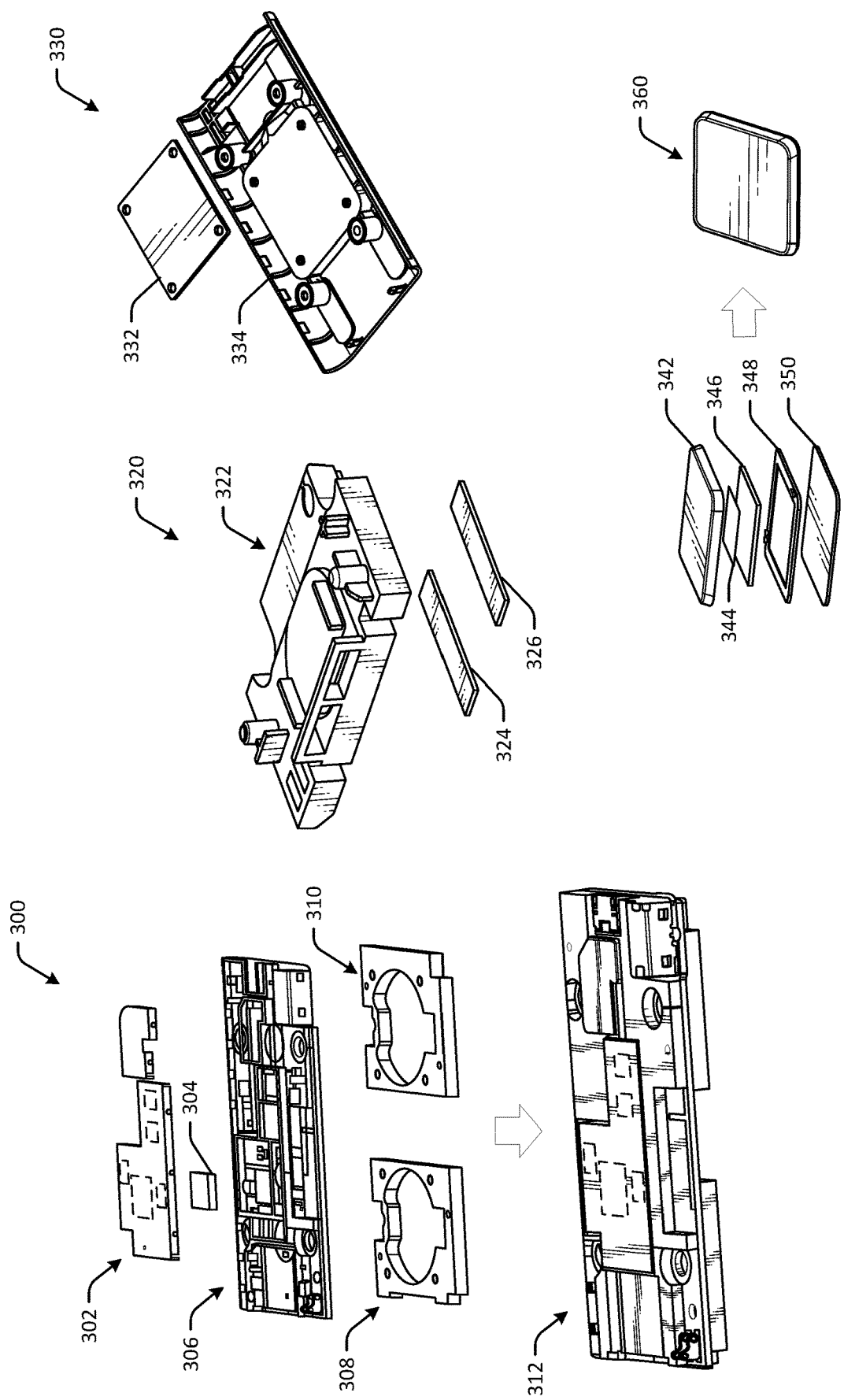
FIG. 7 is a schematic drawing of various sub-assemblies of a portable voice assistant device with a linear lighting element in accordance with one or more embodiments of the disclosure.

FIG. 7 schematically depicts various sub-assemblies of a portable voice assistant device with linear lighting elements in accordance with one or more embodiments of the disclosure. Other embodiments may include different sub-assemblies and/or different configurations.

Some portable voice assistant devices may include a printed circuit board sub-assembly 300. The printed circuit board sub-assembly 300 may include one or more shields 302 configured to reduce radio interference. The printed circuit board sub-assembly 300 may include a printed circuit board 306. A support or pad 304 may be used to support and/or coupled the shields 302 to the printed circuit board 306. A first speaker support 308 and a second speaker support 310 may be coupled to an opposite side of the printed circuit board 306. The printed circuit board sub-assembly 300 may be assembled into a final assembly 312.

Some portable voice assistant devices may include a speaker sub-assembly 320. The speaker sub-assembly 320 may include a speaker housing 322 configured to support one or more speakers of the portable voice assistant device. One of more portions of speaker foam may be used to insulate and/or seal the speaker housing 322. For example, a first foam portion 324 and a second foam portion 326 may be disposed on a surface of the speaker housing 322. In some embodiments, the foam portions may be disposed in recessed portions of the speaker housing 322, so as to have a flush outer surface.

Some portable voice assistant devices may include a bottom housing sub-assembly 330. The bottom housing sub-assembly 330 may include a bottom housing portion 334 that may include one or more curved portions and a metal plate 332 that may be coupled to the bottom housing portion 334. The metal plate 332 may be used for magnetic mounting in some embodiments.

Some portable voice assistant devices may include a removable mount sub-assembly 360. The removable mount sub-assembly 360 may include a chamfered outer surface 342, one or more magnets 346 coupled to the chamfered outer surface 342 (e.g., with an adhesive layer 344, for example), and a bottom support 348. A bottom surface 350 may be coupled to the chamfered outer surface 342 and may include an adhesive side.

FIG. 8 schematically depicts a portable voice assistant device 400 with a linear lighting element in front view in accordance with one or more embodiments of the disclosure. The portable voice assistant device 400 may include a light bar 410. The light bar 410 may be a light output aperture for light output by one or more LEDs disposed within the portable voice assistant device 400, and may be disposed along an outer surface of the device. For example, a user may visually perceive light through the light bar 410. The light bar 410 may be formed of a translucent black polycarbonate material in one example. Light transmission or translucency of the material may be between about 45% and about 60%, such as about 50%. The light bar may be formed of a clear black resin and may be a slightly transparent material. Translucency of the light bar may be based on a thickness of the light bar.

The light bar 410 may be positioned adjacent to a curved end 412 of a top portion of the portable voice assistant device 400. For example, the light bar 410 may be positioned on a lower half of the portable voice assistant device 400 as determined by a horizontal axis or horizontal plane 418 (that may extend into the page). Because the light bar 410 is positioned on a lower half of the portable voice assistant device 400, the light bar 410 may be less likely to be exposed to direct sunlight, and may therefore maintain visibility. The light bar 410 may be positioned within a cutout of a bottom portion of the housing, as illustrated in FIG. 8. The light bar 410 may be an optically clear or colored elongated component through which light from one or more LEDs may be visible. The light bar 410 may be positioned at a front side of the portable voice assistant device 400. In some embodiments, such as the illustrated embodiment, the light bar 410 may be linear or straight and may be positioned between top and bottom portions of the device housing. The light bar 410 may therefore be attached to, or integrated into, the housing and may optionally form an edge of the housing.

The light bar 410 may be configured to indicate a location of sound detected by the portable voice assistant device 400. For example, if a microphone of the portable voice assistant device 400 detects sound or voice coming from a left side of the portable voice assistant device 400, one or more LEDs on the left side of the portable voice assistant device 400 may be caused to illuminate, so as to indicate to a user that sound is being detected from the left side of the portable voice assistant device 400. The light bar 410 may dynamically modify LEDs that are illuminated while sound or voice is detected, and may also be used to visually communicate information to a user. For example, during processing, the light bar 410 may have a certain illumination status, while the device is muted, the light bar 410 may have a different illumination status, and so forth. The light bar 410 may be a straight or linear light bar component and may be visible to users. In some embodiments, the light bar 410 may be positioned elsewhere, along different edges or surfaces, and can be positioned diagonally or in another orientation respective to the housing of the device. In some embodiments the light bar 410 may extend along the entire width of the portable voice assistant device 400, while in other embodiments, the light bar 410 may have a length that is less than a width of the portable voice assistant device 400. Rubber supports 414 may extend slightly above or slightly below a bottom surface 416 of a removable mount.

FIG. 9 schematically depicts a portion 420 of a portable voice assistant device in cross-sectional view in accordance with one or more embodiments of the disclosure. The portable voice assistant device 420 may be the portable voice assistant device 400 or a different portable voice assistant device.

In the illustrated cross-sectional view, a linear lighting element assembly is partially depicted. The linear lighting element assembly, or light bar assembly, may include one or more LEDs 440 disposed on a printed circuit board 430, a diffuser 470, the light bar 410, and a reflector component (not illustrated in FIG. 9). The one or more LEDs 440 may be configured to emit light and may be arranged in a linear arrangement at or near an edge of the printed circuit board 430. The LEDs 440 may be side-firing or top-firing LEDs. For example, the illustrated embodiment may include a first LED 442, a second LED 444, a third LED 446, a fourth LED 448, a fifth LED 450, a sixth LED 452, a seventh LED 454, an eighth LED 456, a ninth LED 458, a tenth LED 460, and an eleventh LED 462. Other embodiments may include additional or fewer LEDs.

The portable voice assistant device may include the diffuser 470. The diffuser 470 may be configured to diffuse at least a portion of light emitted by the LEDs 440. The diffuser 470 may be positioned adjacent to the LEDs 440 and adjacent to the light bar 410, or in between the light bar 410 and the LEDs 440. The light bar 410 may have a first thickness, and the diffuser 470 may have a second thickness that is greater than, less than, or equal to the first thickness.

The diffuser 470 may be a white or light colored diffuser and may have one or more rough surfaces. The diffuser 470 may be translucent or substantially translucent and may optionally include surface features configured to diffuse light. In one example, the diffuser 470 may be formed from translucent white polycarbonate material. A rough surface may be formed with a number of surface features, such as raised bumps or other protrusions or grooves, valleys, or patterns formed on a surface of the diffuser 470, such as the surface facing the LEDs 440. The diffuser may be optically clear in some embodiments.

The diffuser 470 may include one or more curved portions and one or more flat portions. Curved portions may be peaked ridges or other peak-and-valley arrangements. For example, as illustrated in FIG. 9, the diffuser 470 may include a first curved portion 480 or bump, a second curved portion 484, a third curved portion 488, and so forth. The diffuser 470 may include flat portions such as a first flat portion 486 between the second curved portion 484 and the third curved portion 488. Some embodiments may not include flat portions and may instead include peak-and-valley or saw tooth configurations. The diffuser 470 may include a blended region 482 at or near edges of the diffuser 470. FIG. 10 illustrates the diffuser 470 in a standalone top view.

The curved portions of the diffuser 470 may reduce hotspots or bright spots caused by the LEDs 440, and may increase uniformity of light visible through the light bar 410. By diffusing light emitted by the LEDs, uniformity may be increased, as the light may be spread or diffused by the curved portions to a greater degree than by the flat portions. To increase uniformity, the curved portions of the diffuser 470 may be aligned with, or positioned adjacent to, the respective LEDs 440. For example, the first curved portion 480 may be aligned with the eight LED 456. In some embodiments, the first curved portion 480 may be aligned with a central axis (illustrated for example in FIG. 9) of the eighth LED 456. A central axis of the seventh LED 454 is also illustrated in FIG. 9. In some embodiments, a central axis of an LED may be aligned with a midpoint of an arc of curvature of the corresponding curved portion. In other embodiments, the central axis of an LED may be aligned with an apex of the corresponding curved portion. In another example, a central axis may intersect or be transverse to any point of a curved portion between a first edge and a second edge (where an edge is an intersection of the curved portion and the flat portion) of the corresponding curved portion.

In embodiments where the LEDs 440 are side-firing LEDs, a reflector component may not be included, as the LEDs 440 may direct light output towards the diffuser 470, instead of downwards. Accordingly, such embodiments may not include reflector components, as the light output may be directed to the diffuser. The diffuser may therefore extend from the top portion of the housing to the bottom portion of the housing.

FIG. 10 illustrates the diffuser 470 alone in a top view. The curved portions of the diffuser 470 may have a width 490 that corresponds to a light cone or light output of the respective LEDs 440. For example, the wider the light cone output by an LED, the greater the width 490 of the curved portion. Curved portions may be separated by flat portions. The width of a flat portion may be based at least in part on a distance between adjacent LEDs. For example, a flat portion may have a width 492 that is equal to or less than a distance between two LEDs, such as two adjacent LEDs. In some embodiments, each curved portion may have the same width, and each flat portion may have the same width (the respective widths may be different from each other or may be the same).

Figure 11:
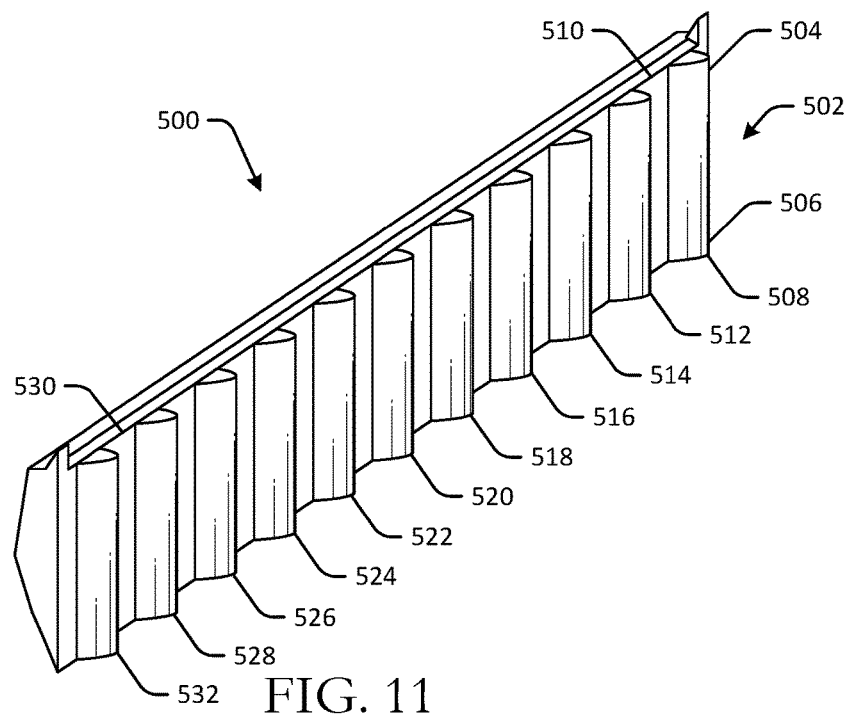

FIG. 11 schematically depicts a diffuser 500 in perspective view in accordance with one or more embodiments of the disclosure. The diffuser 500 may be the diffuser of FIGS. 9-10. The diffuser 500 may be a white translucent diffuser bar and may have one or more raised bumps or curved portions 502. For example, the diffuser 500 may include evenly or uniformly spaced curved portions, including a first curved portion 508, a second curved portion 512, a third curved portion 514, a fourth curved portion 516, a fifth curved portion 518, a sixth curved portion 520, a seventh curved portion 522, an eighth curved portion 524, a ninth curved portion 526, a tenth curved portion 528, and an eleventh curved portion 532. The eleven curved portions or bumps may correspond to the eleven LEDs 440 of FIG. 9, for example. One or more flat portions may separate adjacent curved portions. For example, a first flat portion 510 may separate the first curved portion 508 and the second curved portion 512, and a second flat portion 530 may separate the tenth curved portion 528 from the eleventh curved portion 532. The curved portions may have an optional taper or draft. For example, the first curved portion 508 may be tapered between a first end 506 and a second end 504, or between the second end 504 and the first end 506. The taper may indicate a gradual change in curvature or size of the curved portion between the respective ends. The first end 504 may be adjacent to a top side of the diffuser and the second end 506 may be adjacent to a bottom side of the diffuser, or the first end 504 may be adjacent to a bottom side of the diffuser and the second end 506 may be adjacent to a top side of the diffuser.

Some embodiments may include cutouts instead of or in addition to the curved portions (where the cutout is a like a groove). Cutouts may be semicircular and may reduce hotspots and/or increase color uniformity across the light bar 410. In some embodiments, the light bar 410 may be colored or occluded.

Figure 12:
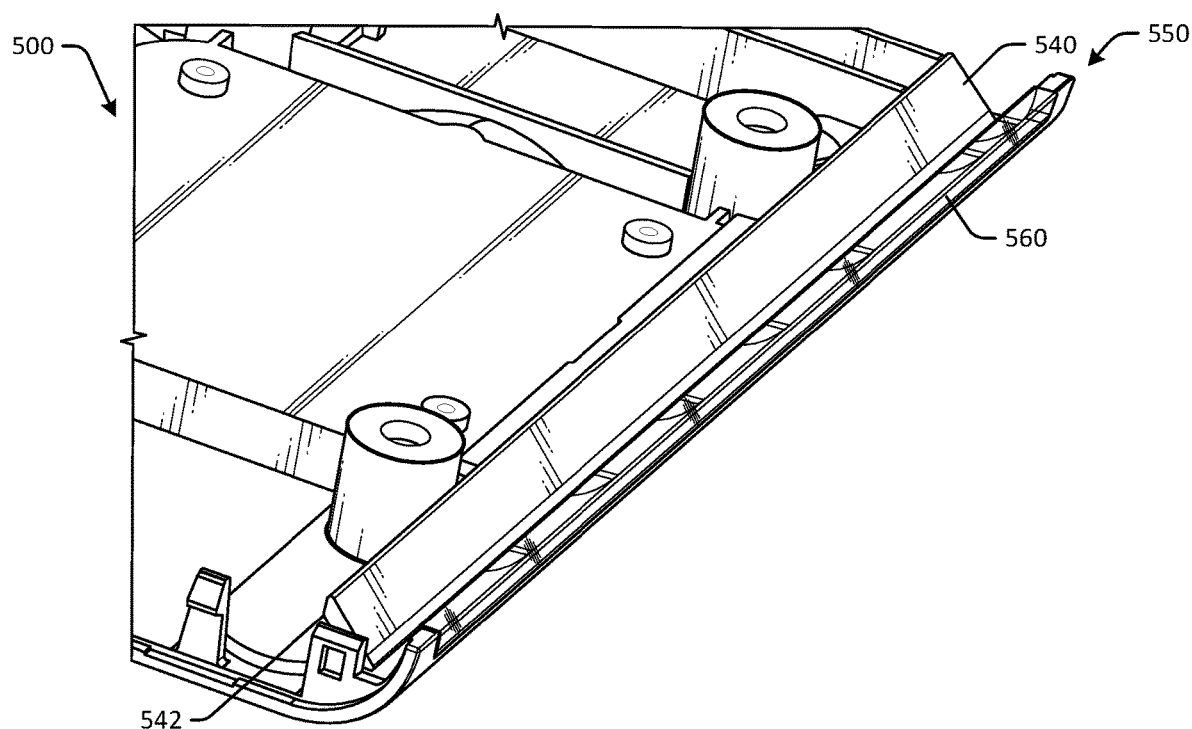
FIG. 12 is a schematic drawing of a reflector component and light bar in perspective view in accordance with one or more embodiments of the disclosure.

FIG. 12 schematically depicts a reflector component 540 and light bar 560 of a portable voice assistant device 550 in a perspective view in accordance with one or more embodiments of the disclosure. The reflector component 540 may be a scattering reflector and may be configured to reflect light emitted by one or more LEDs, such as the LEDs 440 of FIG. 9. The reflector component 540 may be angled toward the light bar 560. In some embodiments, the reflector component 540 may be angled at about 45 degrees, or at 45 degrees, with respect to a horizontal planar axis of the portable voice assistant device 550. The reflector component 540 may include a reflective surface that is configured to reflect light in one or more directions, such as towards the light bar 560. The reflector component 540 may have a thickness 542 that may be varied based on surface treatments of a reflective surface of the reflective component 540. In some embodiments, the reflector component 540 may be white or light colored.

Figure 13:
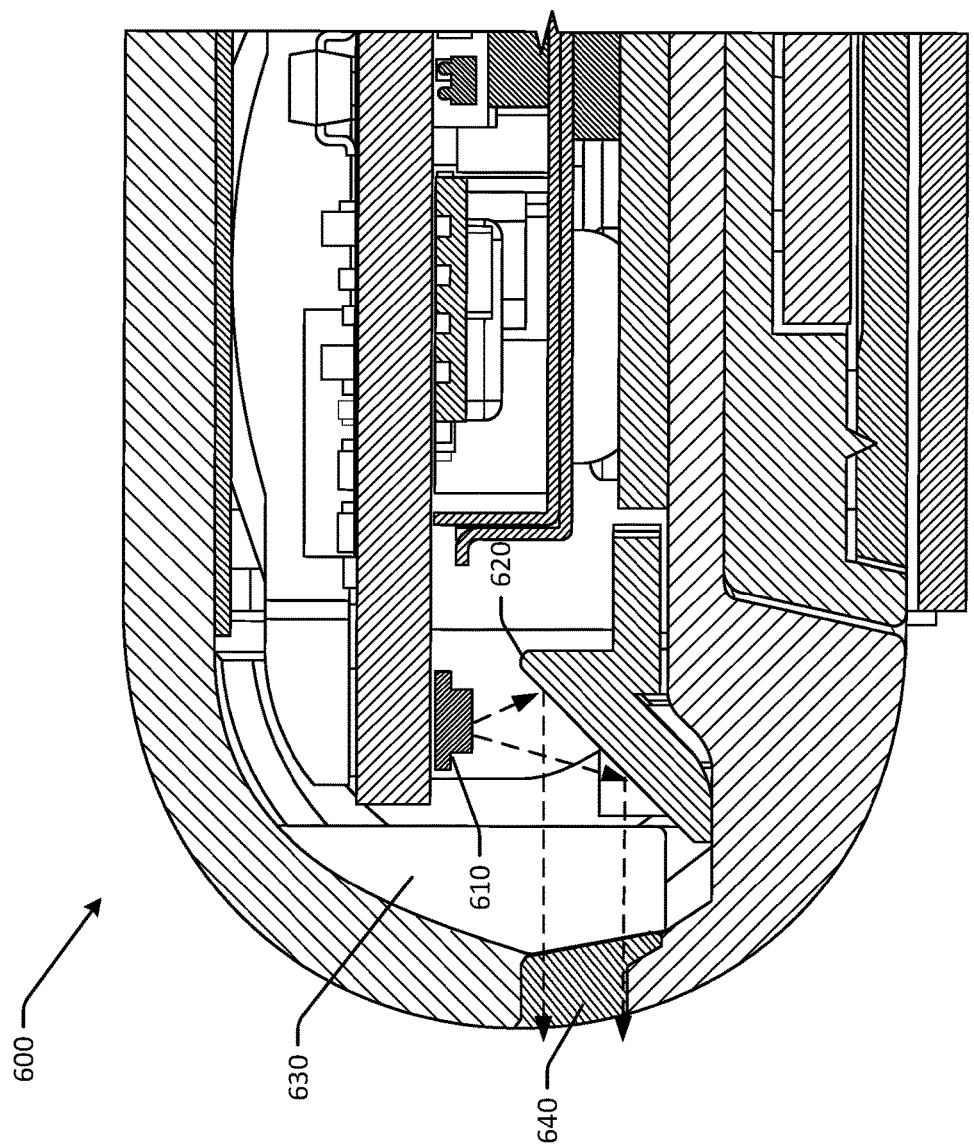
FIG. 13 is a schematic drawing of a cross-sectional view of a portable voice assistant device with a linear lighting element in accordance with one or more embodiments of the disclosure.

FIG. 13 schematically depicts a linear lighting element assembly of a portable voice assistant device 600 in cross-sectional view in accordance with one or more embodiments of the disclosure. The linear lighting assembly may include one or more LEDs 610, a reflector component 620, a diffuser component 630, and a light bar or translucent filter 640. The LEDs 610 may be the LEDs 440, the reflector component 620 may be the reflector component 540, the diffuser component 630 may be the diffuser 500, and the light bar 640 may be the light bar 410. The LEDs 610 may be oriented so as to direct light or concentrate a direction of light towards the reflector component 620. For example, the LEDs 610 may be top-firing LEDs that direct light downwards (as relative to the illustration in FIG. 13) towards a reflective surface of the reflector component 620. The reflector component 620 may be formed of a solid white material and may be polycarbonate, in one example. The reflector component 620 may include a reflective surface that is oriented at an angle transverse to a horizontal axis of the portable voice-activated device. The emitted light may be reflected by the reflector component 620 and directed towards the diffuser component 630. The reflected light may propagate through the diffuser component 630 and be diffused in a number of directions. The diffused light may propagate through the light bar 640 and may be visible from outside the device. At least a portion of light emitted by the LEDs 610 that is not reflected by the reflector component 620 may impinge a curved portion of the diffuser component 630, and may be diffused in more directions that reflected light, as a result of the curved portions having a greater thickness and/or angle of impingement. In some embodiments, the curved portions may be formed on the reflector component 620 instead of the diffuser component 630, and may result in the same or similar light uniformity. As a result, light emitted by the LEDs 610 may be visible as uniform and without bright spots or hot spots, and may be visible in any number of ambient environment conditions.

One or more operations of the methods, process flows, or use cases of FIGS. 1-13 may have been described above as being performed by a user device, or more specifically, by one or more program module(s), applications, or the like executing on a device. It should be appreciated, however, that any of the operations of the methods, process flows, or use cases of FIGS. 1-13 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-13 may be described in the context of the illustrative devices, it should be appreciated that such operations may be implemented in connection with numerous other device configurations.

The operations described and depicted in the illustrative methods, process flows, and use cases of FIGS. 1-13 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-13 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 14:
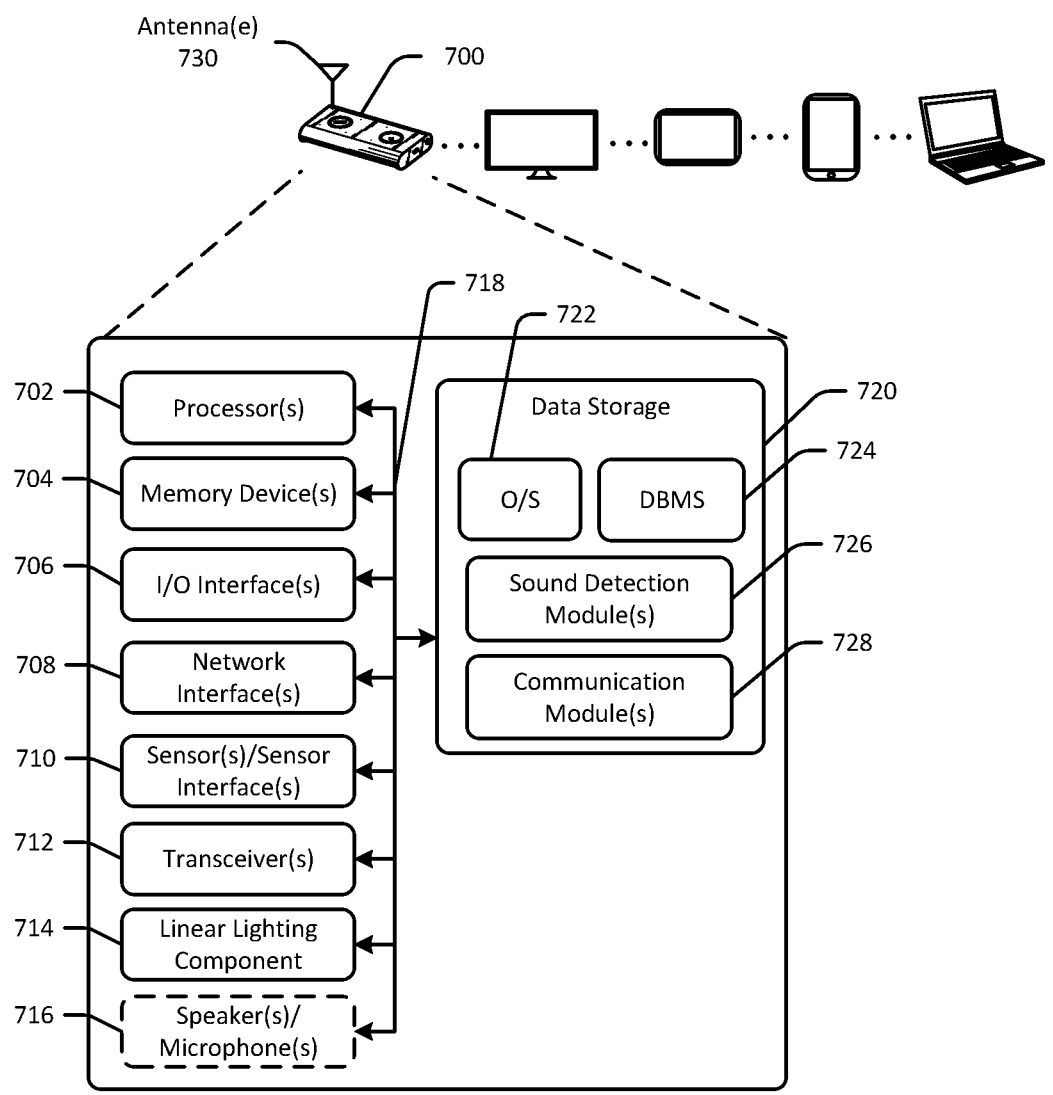
FIG. 14 schematically illustrates an example architecture of a portable electronic device in accordance with one or more embodiments of the disclosure.

FIG. 14 is a schematic block diagram of one or more illustrative portable voice assistant device(s) 700 in accordance with one or more example embodiments of the disclosure. The portable voice assistant device(s) 700 may include any suitable computing device with a light bar component without a display, in some instances, including, but not limited to, a server system, a mobile device such as a smartphone, a tablet, an e-reader, a wearable device, or the like; a desktop computer; a laptop computer; a content streaming device; a set-top box; a scanning device; a speaker device; or the like. The portable voice assistant device(s) 700 may correspond to an illustrative device configuration for the scanning device of FIGS. 1-13.

The portable voice assistant device(s) 700 may be configured to communicate with one or more servers, user devices, or the like. The portable voice assistant device(s) 700 may be configured to determine voice commands, determine wakeword utterances, determine and/or control other devices, and other operations. The portable voice assistant device(s) 700 may be configured to emit light, detect sound, output digital content, and other functionality. In some embodiments, a single remote server or a single group of remote servers may be configured to perform more than one type of functionality in conjunction with a barcode scanning device.

The portable voice assistant device(s) 700 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the portable voice assistant device(s) 700 may include one or more processors (processor(s)) 702, one or more memory devices 704 (also referred to herein as memory 704), one or more input/output (I/O) interface(s) 706, one or more network interface(s) 708, one or more sensor(s) or sensor interface(s) 710, one or more transceiver(s) 712, one or more linear lighting elements 714, and one or more optional camera(s)/microphone(s) 716, and data storage 720. The portable voice assistant device(s) 700 may further include one or more bus(es) 718 that functionally couple various components of the portable voice assistant device(s) 700. The portable voice assistant device(s) 700 may further include one or more antenna(e) 730 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 718 may include at least one of a system bus, a memory bus, an address bus, or a message bus, and may permit the exchange of information (e.g., data (including computer-executable code), signaling, etc.) between various components of the portable voice assistant device(s) 700. The bus(es) 718 may include, without limitation, a memory bus or a memory controller, a peripheral bus, an accelerated graphics port, and so forth. The bus(es) 718 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 704 of the portable voice assistant device(s) 700 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 704 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 704 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 720 may include removable storage and/or non-removable storage including, but not limited to, magnetic storage, optical disk storage, and/or tape storage. The data storage 720 may provide non-volatile storage of computer-executable instructions and other data. The memory 704 and the data storage 720, removable and/or non-removable, are examples of computer-readable storage media (CRSM) as that term is used herein.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to the memory 704 for use by the processor(s) 702 during the execution of the computer-executable instructions. Moreover, output data generated as a result of execution of the computer-executable instructions by the processor(s) 702 may be stored initially in the memory 704, and may ultimately be copied to the data storage 720 for non-volatile storage.

More specifically, the data storage 720 may store one or more operating systems (O/S) 722; one or more database management systems (DBMS) 724; and one or more program module(s), applications, engines, computer-executable code, scripts, or the like such as, for example, one or more sound detection module(s) 726 and/or one or more communication module(s) 728. Some or all of these module(s) may be sub-module(s). Any of the components depicted as being stored in the data storage 720 may include any combination of software, firmware, and/or hardware. The software and/or firmware may include computer-executable code, instructions, or the like that may be loaded into the memory 704 for execution by one or more of the processor(s) 702. Any of the components depicted as being stored in the data storage 720 may support functionality described in reference to corresponding components named earlier in this disclosure.

The data storage 720 may further store various types of data utilized by the components of the portable voice assistant device(s) 700. Any data stored in the data storage 720 may be loaded into the memory 704 for use by the processor(s) 702 in executing computer-executable code. In addition, any data depicted as being stored in the data storage 720 may potentially be stored in one or more datastore(s) and may be accessed via the DBMS 724 and loaded in the memory 704 for use by the processor(s) 702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 14, an example datastore(s) may include, for example, historical data for previously identified products, purchase or order history, user profile information, and/or other information.

The processor(s) 702 may be configured to access the memory 704 and execute the computer-executable instructions loaded therein. For example, the processor(s) 702 may be configured to execute the computer-executable instructions of the various program module(s), applications, engines, or the like of the portable voice assistant device(s) 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to functionality supported by the various program module(s) depicted in FIG. 14, the sound detection module(s) 726 may include computer-executable instructions, code, or the like that responsive to execution by one or more of the processor(s) 702 may perform functions including, but not limited to, detect sound, determine sound meanings, generate audio signals and audio data, determine a location of sound, determining a light bar illumination status, determining which LEDs to illuminate, causing a change in illumination status, and the like.

The communication module(s) 728 may include computer-executable instructions, code, or the like that responsive to execution by one or more of the processor(s) 702 may perform functions including, but not limited to, sending and/or receiving data, including content, sending and/or receiving instructions and commands, and the like.

Referring now to other illustrative components depicted as being stored in the data storage 720, the O/S 722 may be loaded from the data storage 720 into the memory 704 and may provide an interface between other application software executing on the portable voice assistant device(s) 700 and the hardware resources of the portable voice assistant device(s) 700. More specifically, the O/S 722 may include a set of computer-executable instructions for managing the hardware resources of the portable voice assistant device(s) 700 and for providing common services to other application programs (e.g., managing memory allocation among various application programs). In certain example embodiments, the O/S 722 may control execution of the other program module(s). The O/S 722 may include any operating system now known or which may be developed in the future including, but not limited to, any server operating system, any mainframe operating system, or any other proprietary or non-proprietary operating system.

The DBMS 724 may be loaded into the memory 704 and may support functionality for accessing, retrieving, storing, and/or manipulating data stored in the memory 704 and/or data stored in the data storage 720. The DBMS 724 may use any of a variety of database models (e.g., relational model, object model, etc.) and may support any of a variety of query languages. The DBMS 724 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the portable voice assistant device(s) 700 is a mobile device, the DBMS 724 may be any suitable lightweight DBMS optimized for performance on a mobile device.

Referring now to other illustrative components of the portable voice assistant device(s) 700, the input/output (I/O) interface(s) 706 may facilitate the receipt of input information by the portable voice assistant device(s) 700 from one or more I/O devices as well as the output of information from the portable voice assistant device(s) 700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the portable voice assistant device(s) 700 or may be separate. The I/O devices may further include, for example, any number of peripheral devices such as data storage devices, printing devices, and so forth.

The I/O interface(s) 706 may also include an interface for an external peripheral device connection such as universal serial bus (USB), FireWire, Thunderbolt, Ethernet port or other connection protocol that may connect to one or more networks. The I/O interface(s) 706 may also include a connection to one or more of the antenna(e) 730 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The portable voice assistant device(s) 700 may further include one or more network interface(s) 708 via which the portable voice assistant device(s) 700 may communicate with any of a variety of other systems, platforms, networks, devices, and so forth. The network interface(s) 708 may enable communication, for example, with one or more wireless routers, one or more host servers, one or more web servers, and the like via one or more networks.

The antenna(e) 730 may include any suitable type of antenna depending, for example, on the communications protocols used to transmit or receive signals via the antenna (e) 730. Non-limiting examples of suitable antennae may include directional antennae, non-directional antennae, dipole antennae, folded dipole antennae, patch antennae, multiple-input multiple-output (MIMO) antennae, or the like. The antenna(e) 730 may be communicatively coupled to one or more transceivers 712 or radio components to which or from which signals may be transmitted or received.

As previously described, the antenna(e) 730 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 730 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 730 may be configured to transmit or receive radio frequency signals within any suitable frequency range forming part of the unlicensed portion of the radio spectrum.

The antenna(e) 730 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 712 may include any suitable radio component(s) for—in cooperation with the antenna(e) 730—transmitting or receiving radio frequency (RF) signals in the bandwidth and/or channels corresponding to the communications protocols utilized by the portable voice assistant device(s) 700 to communicate with other devices. The transceiver(s) 712 may include hardware, software, and/or firmware for modulating, transmitting, or receiving—potentially in cooperation with any of antenna(e) 730—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 712 may further include hardware, firmware, or software for receiving GNSS signals. The transceiver(s) 712 may include any known receiver and baseband suitable for communicating via the communications protocols utilized by the portable voice assistant device(s) 700. The transceiver(s) 712 may further include a low noise amplifier (LNA), additional signal amplifiers, an analog-to-digital (A/D) converter, one or more buffers, a digital baseband, or the like.

The sensor(s)/sensor interface(s) 710 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The linear lighting element(s) 714 may include one or more LEDs that may be illuminated responsive to detected sound and may be in a linear configuration. The optional camera(s) 716 may be any device configured to capture ambient light or images. The optional microphone(s) 716 may be any device configured to receive analog sound input or voice data.

It should be appreciated that the program module(s), applications, computer-executable instructions, code, or the like depicted in FIG. 14 as being stored in the data storage

720 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the portable voice assistant device(s) 700, and/or hosted on other computing device(s) accessible via one or more networks, may be provided to support functionality provided by the program module(s), applications, or computer-executable code depicted in FIG. 14 and/or additional or alternate functionality. Further, functionality may be modularized differently such that processing described as being supported collectively by the collection of program module(s) depicted in FIG. 14 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 14 may be implemented, at least partially, in hardware and/or firmware across any number of devices.

It should further be appreciated that the portable voice assistant device(s) 700 may include alternate and/or additional hardware, software, or firmware components beyond those described or depicted without departing from the scope of the disclosure. More particularly, it should be appreciated that software, firmware, or hardware components depicted as forming part of the portable voice assistant device(s) 700 are merely illustrative and that some components may not be present or additional components may be provided in various embodiments. While various illustrative program module(s) have been depicted and described as software module(s) stored in the data storage 720, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-13 may be performed by a device having the illustrative configuration depicted in FIG. 14, or more specifically, by one or more engines, program module(s), applications, or the like executable on such a device. It should be appreciated, however, that such operations may be implemented in connection with numerous other device configurations.

The operations described and depicted in the illustrative methods and process flows of FIGS. 1-13 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-13 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A voice-activated device for use in an automobile, the voice-activated device comprising:
    a housing having a top curved portion and a bottom curved portion, wherein the top curved portion forms a first half of an outer surface of the voice-activated device;
    a translucent black resin component disposed between the top curved portion and the bottom curved portion, wherein the translucent black resin component and the bottom curved portion together form a second half of the outer surface;
    a circuit board disposed within the housing;
    a first light emitting diode (LED) disposed on the circuit board;
    a reflective surface disposed within the housing and oriented at about 45 degrees with respect to a horizontal axis of the voice-activated device; and
    a diffuser disposed adjacent to the translucent black resin component and configured to diffuse light reflected from the reflective surface, wherein the diffuser comprises a first curved portion adjacent to the first LED;
    wherein a portion of light emitted by the first LED is reflected by the reflector and propagates through both the diffuser and the translucent black resin component.

2. The voice-activated device of claim 1, further comprising:
    a second LED disposed on the circuit board and separated from the first LED by a distance;
    wherein the diffuser further comprises a second curved portion adjacent to the second LED and a flat portion between the first curved portion and the second curved portion, wherein a width of the flat portion is less than or equal to the distance.

3. The voice-activated device of claim 1, wherein the first curved portion comprises a first edge and a second edge, and wherein a central axis of the first LED is transverse to the first curved portion at any point between the first edge and the second edge.

4. A portable voice-activated device comprising:
a housing having a first portion and a second portion;
an elongated light bar disposed between the first portion and the second portion, wherein the elongated light bar comprises a translucent black material;
a first LED disposed within the housing; and
a diffuser positioned adjacent to the elongated light bar, the diffuser comprising a first curved portion that is substantially aligned with the first LED, wherein the diffuser is substantially translucent and comprises a plurality of surface features configured to diffuse light.

5. The portable voice-activated device of claim 4, further comprising:
a second LED separated from the first LED by a distance;
wherein the diffuser further comprises a flat portion and a second curved portion that is separated from the first curved portion by the flat portion; and
wherein the flat portion has a width that is less than or equal to the distance.

6. The portable voice-activated device of claim 4, further comprising:
a reflector component configured to reflect light towards the elongated light bar;
wherein the reflector component comprises a reflective surface that is oriented at an angle transverse to a horizontal axis of the portable voice-activated device.

7. The portable voice-activated device of claim 6, wherein the first LED emits a first portion of light towards the reflector component, and a second portion of light towards the first curved portion, and wherein the first curved portion diffuses the second portion of light.

8. The portable voice-activated device of claim 4, further comprising:
a first connector port positioned along a horizontal axis that is defined along a center of a sidewall of the housing; and
a second connector port positioned offset from the horizontal axis of the housing.

9. The portable voice-activated device of claim 4, wherein the second portion of the housing comprises a cutout portion, and wherein the elongated light bar is disposed within the cutout portion.

10. The portable voice-activated device of claim 4, wherein the first portion is disposed on a first side of a horizontal plane bisecting a sidewall of the portable voice-activated device, and both the second portion and the elongated light bar are disposed on a second side of the horizontal plane.

11. The portable voice-activated device of claim 4, further comprising:
at least one button comprising a raised protrusion, the at least one button accessible through the first portion.

12. The portable voice-activated device of claim 4, wherein the second portion of the housing comprises a recessed portion, the portable voice-activated device further comprising:
a magnetic mount positioned within the recessed portion, wherein the magnetic mount comprises an adhesive disposed on a surface, and wherein the magnetic mount is removable from the recessed portion.

13. The portable voice-activated device of claim 4, wherein the first curved portion comprises a first end adjacent to a top side of the diffuser and a second end adjacent to a bottom side of the diffuser, and wherein the first curved portion is tapered between the first end and the second end.

14. The portable voice-activated device of claim 4, wherein a center point of a curve forming an outer surface of the first curved portion is substantially aligned with a central axis of the first LED.

15. The portable voice-activated device of claim 4, wherein the first portion comprises a first sidewall and a second sidewall that form sides of the portable voice-activated device, and wherein the second portion comprises a cutout portion configured to receive the elongated light bar.

16. The portable voice-activated device of claim 4, wherein the first LED is a side-firing LED, and the diffuser extends between the first portion and the second portion.

17. A device comprising:
a microphone;
a speaker;
a housing having a top portion and a bottom portion;
a linear light bar component disposed along an outer surface of the device, wherein the linear light bar comprises a translucent black material;
a plurality of LEDs positioned within the housing; and
a diffuser comprising a plurality of raised portions, wherein respective raised portions are aligned with respective LEDs of the plurality of LEDs;
wherein the diffuser is positioned adjacent to the linear light bar component, and wherein the diffuser is substantially translucent and comprises a plurality of surface features configured to diffuse light.

18. The device of claim 17, further comprising:
a reflective surface configured to reflect light emitted by the plurality of LEDs towards the diffuser.

19. The device of claim 17, wherein the linear light bar component has a thickness of about 1 millimeter and an optical transmission value greater than about 35% and less than about 75%.

20. The device of claim 17, wherein the linear light bar component has a first thickness, and the diffuser has a second thickness that is greater than the first thickness.

* * * * *